United States Patent [19]
Lovrenich

[11] Patent Number: 4,635,911
[45] Date of Patent: Jan. 13, 1987

[54] MOTORIZED OVER CENTER CLAMP

[76] Inventor: Rodger T. Lovrenich, 209 Whispering Sands, Santa Teresa, N. Mex. 88008

[21] Appl. No.: 771,101

[22] Filed: Aug. 30, 1985

[51] Int. Cl.[4] ............ B23Q 3/02

[52] U.S. Cl. ............ 269/93; 269/224; 269/226; 269/228

[58] Field of Search ............ 269/91, 93, 94, 61, 269/228, 224, 225, 226, 329; 254/2 C

[56] References Cited

U.S. PATENT DOCUMENTS

| | | | |
|---|---|---|---|
| 789,906 | 5/1905 | Gordon | 269/228 |
| 960,070 | 5/1910 | Brown | 269/225 |
| 2,162,133 | 6/1939 | Spire | 269/228 |
| 2,369,362 | 2/1945 | Marziani | 269/228 |
| 2,634,639 | 4/1953 | Sowell | 269/226 |
| 3,034,778 | 5/1962 | Shaffer et al. | 269/224 |
| 4,470,578 | 9/1984 | Arvidsson et al. | 254/2 C |

*Primary Examiner*—Robert C. Watson
*Attorney, Agent, or Firm*—Barnes, Kisselle, Raisch, Choate, Whittemore & Hulbert

[57] ABSTRACT

A motorized over center clamp for clamping parts or work pieces utilizes a sequence controller to drive an electric motor and rotate a worm wheel mounted on a worm wheel shaft. A crank rod assembly is rotationally mounted in an off center position on the worm wheel and has curved closed end track portions that ride on the worm wheel shaft. The crank rod assembly is connected to a piston that moves a clamp rod under spring pressure. When the motor has rotated its shaft to the clamped position of the clamp, rotation of the motor shaft is stopped and the clamp is held in position by the spring forcing a mechanical over center condition of the crank rod assembly relative to the worm wheel shaft. The spring length is sensed to determine energy stored in the spring and detect lack of work pieces, work pieces out of position or work pieces that are oversized.

18 Claims, 5 Drawing Figures

MOTORIZED OVER CENTER CLAMP

The present invention relates to an over center clamp used to clamp a work piece in position.

BACKGROUND OF THE INVENTION

Clamping devices currently used in production facilities require a continual actuating force generated by air or hydraulic cylinders to hold a work piece in place. In the event of power failure the work pieces being held in place by the clamp are released. This is not always desirable or safe.

Such clamping mechanisms must also handle work piecess of slightly different size. These devices do not have simple mechanisms for detecting oversize and undersize work pieces or work pieces out of location.

A device has been sought which would eliminate these shortcomings.

SUMMARY

A preferred embodiment of the present invention provides an over center clamp utilizing an electric motor to drive a worm wheel mounted on a worm wheel shaft. A crank rod assembly is rotationally mounted in an off center position on the worm wheel and has curved closed end track portions that ride on the worm wheel shaft. The crank rod assembly is connected to a piston that moves a clamp rod to the clamped position against spring pressure. When the motor has rotated its shaft to the clamped position of the clamp, the motor can be stopped with power removed and the clamp is held in position by the over center condition of the crank rod assembly. A spring construction enables detection of work pieces that are oversize and undersize, the lack of work pieces, and work pieces out of position, and also maintains the over center condition of the clamp in the event of power failure.

DETAILED DESCRIPTION OF THE INVENTION

Figure 1:
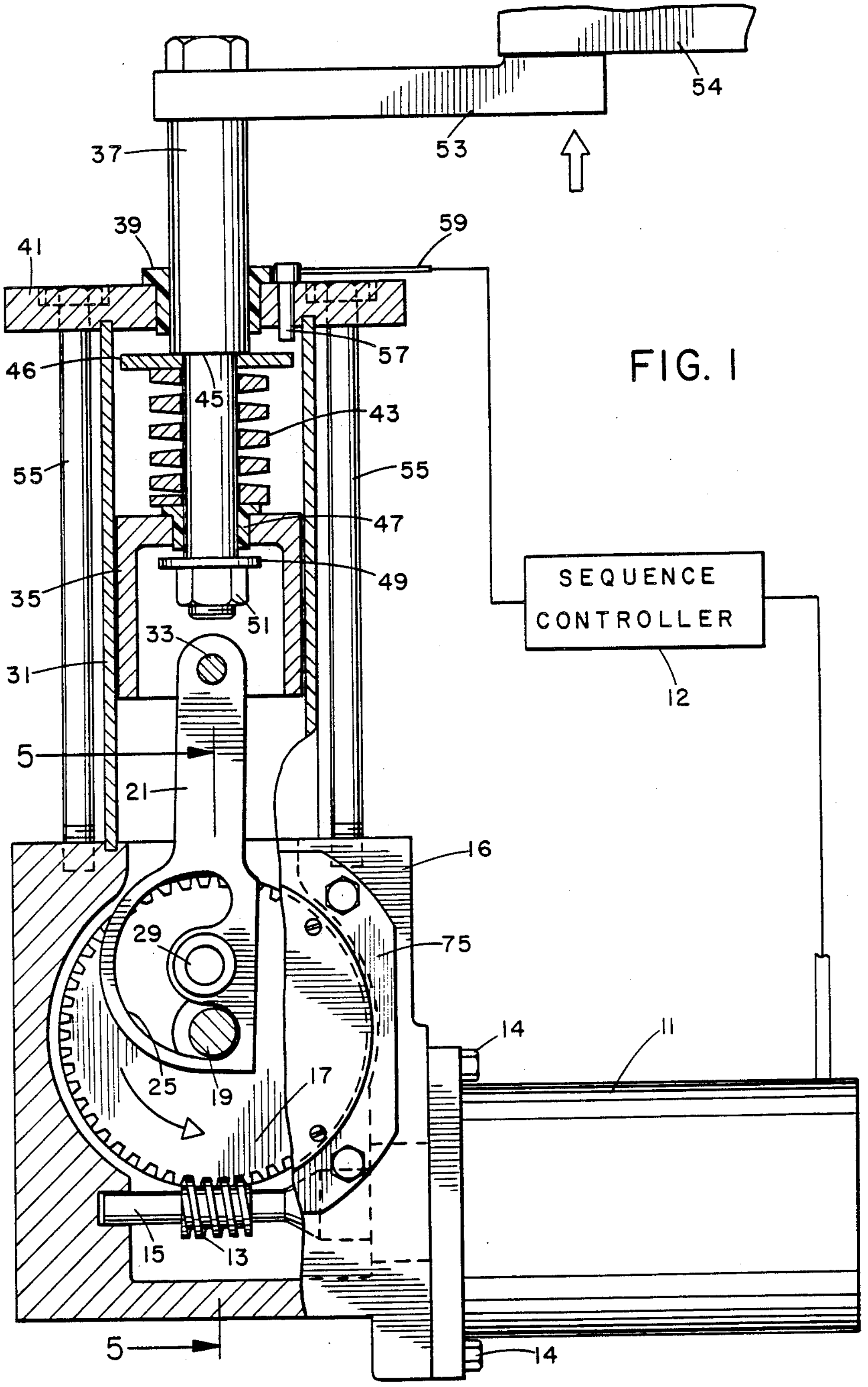
FIG. 1 is a partly sectioned side elevation of the first embodiment of the motorized over center clamp of the present invention in the clamped position, providing a spring that deflects when the load is pushed by the crank rods. An electric motor is controlled by a sequence controller.

In the embodiment of the invention shown in the drawings, an electric motor, such as a servomotor, d.c. motor or stepper motor for example, is shown at 11. The motor 11 is driven and controlled by a conventional logic device known as a sequence controller indicated at 12. The motor 11 is bolted to a drive housing 16 with bolts 14. The drive housing 16 has a cover block 75 (FIGS. 1 and 5) that is configured to accommodate the drive construction and fit against it. The cover block is broken away in FIG. 1 to show internal construction. An upper housing 31 is affixed to drive housing 16 with bolts 55 extending between top plate 41 and housing 16. The housing is a squared construction as particularly shown in FIG. 2. A clamp rod 37 extends out of the upper housing 31 through bearing 39 and includes clamp member 53.

Drive gear 13 is fixed on the motor shaft 15. Within the drive housing 16 the drive gear 13 engages worm wheel 17 which is mounted with needle bearings 70 and 73 on shaft 19. The electric motor 11 thus rotates the worm wheel 17.

Crank rods 21 and 23 (FIGS. 1 and 2) are rotatably mounted with needle bearings 63 and 65 on off center pin 29 that extends through worm wheel 17 and are located one on each side of the worm wheel. This construction avoids an offset load and the resulting wear that would occur with one crank rod. Crank rods 21 and 23 have curved closed end tracks 25 and 27 that are slidably engaged with shaft 19. Thus, when the worm wheel 17 is rotated by the motor 11, the curved tracks 25 and 27 provide clearance for worm wheel shaft 19 as the crank rods 21 and 23 move up and down. The ends of slots 25 and 27 create positive mechanical stops that rest on the pin 29 to prevent overtravel when the spring 43 tries to cause further rotation of the worm wheel 17 with motor power off.

The upper ends of the crank rods 21 and 23 extend upward out of drive housing 16 into cylindrical housing 31 and are rotatably mounted on pin 33 that is seated in piston 35. Clamp rod 37 extends through bearing 39 in top plate 41 that is attached to the housing 31. The clamp rod 37 has a coil spring 43 positioned around its lower portion. One end of the coil spring seats against a bearing insert 47 located in the top of piston 35. The piston is a squared construction as particularly shown in FIG. 2. The squared construction of upper hosing 31 and piston 35 prevents side force on clamp 53 which might cause rotation and binding of clamp arms 21 and 23. Other configurations of the upper housing 31 and piston 35 can be used and a configuration that prevents rotation of the piston in the housing is preferred. The other end of the coil spring 43 seats against a washer 46 of electrically conductive material in the embodiment shown. The washer 46 is positioned against shoulder 45 in clamp rod 37. A proximity sensor 57 is mounted in top plate 41 for sensing the position of washer 46 and thus the length of spring 43. The energy stored in the spring is detected and reported to the sequence controller 12 via line 59.

The clamp rod 37 extends through the top of piston 35 and has a retainer washer 49 adjacent the end to prevent the clamp rod 37 from slipping through the opening in the top of the piston. The retainer washer 49 is held in place by nut 51, that is threaded onto the end of clamp rod 37, and by the top of piston 35. Clamp member 53 is threaded onto the top of clamp rod 37 and is movable by the clamp rod 37 in a vertical direction to provide clamping and unclamping. The top plate 41 is fixed to drive housing 16 with bolts 55.

OPERATION

Figure 2:
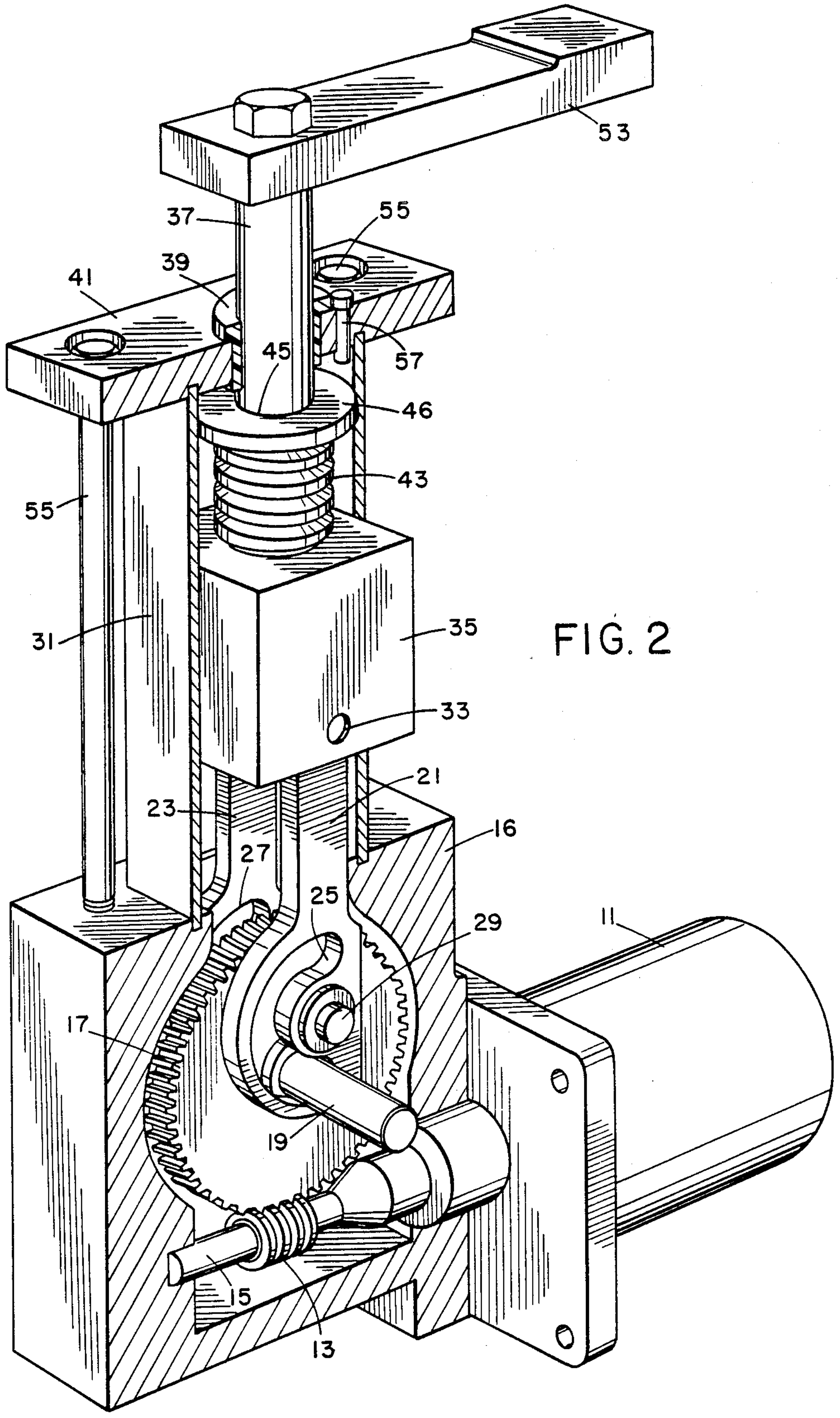
FIG. 2 is a perspective view, partly sectioned, of the clamping device shown in FIG. 1.
Figure 3:
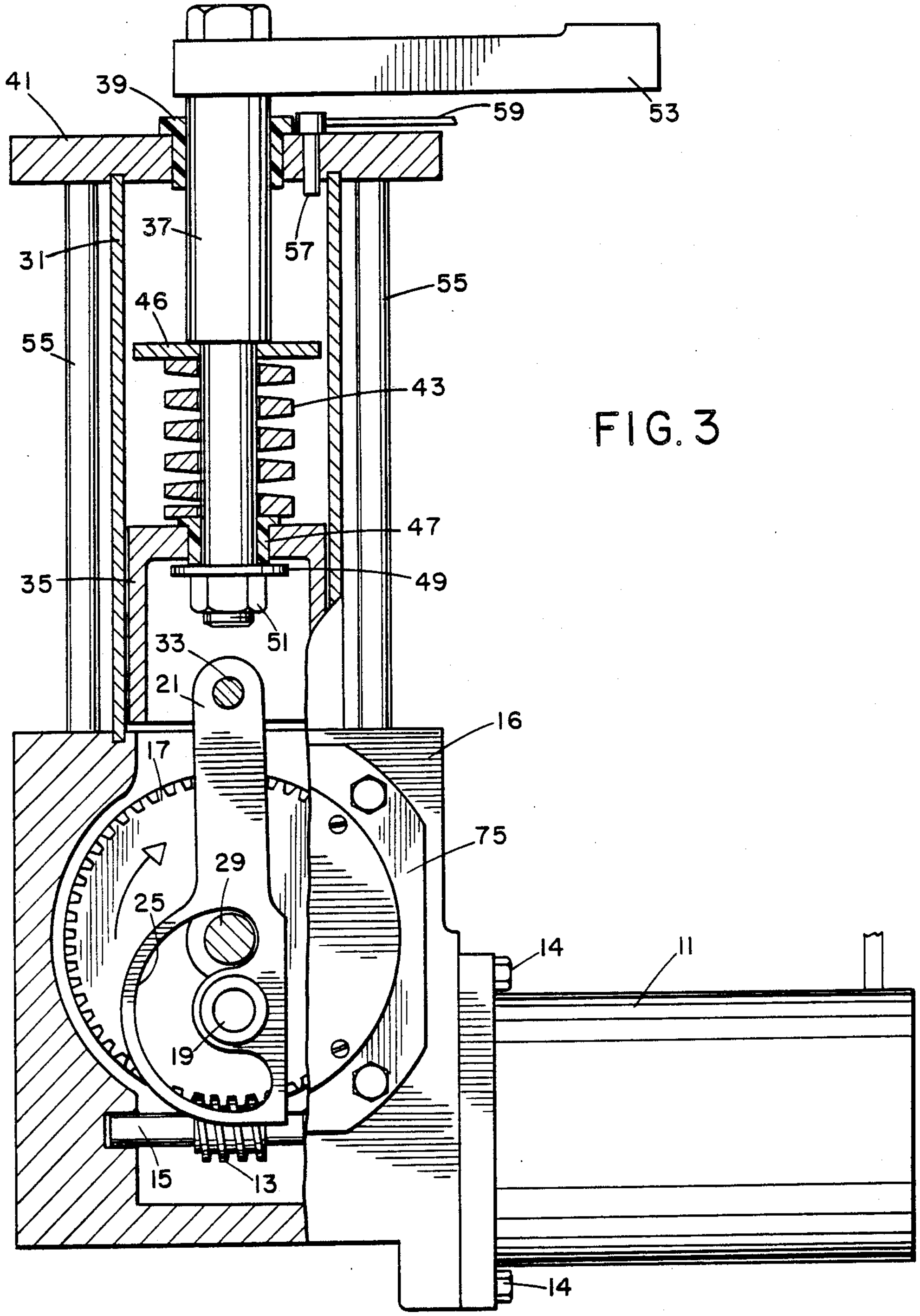
FIG. 3 is a side elevation, partly sectioned, of the clamping device of FIGS. 1 and 2 showing the device in the released position.

The first embodiment of the clamping device of the present invention shown in FIGS. 1-3 is used to move a clamp to a clamped position on a work piece and to move the clamp to an unclamped position at predetermined times. The motor 11 is controlled by sequence controller 12 to accomplish the clamping and unclamping functions.

When it is desired to clamp the clamping mechanism, a command is generated by the sequence controller 12 and sent to the motor 11. Drive gear 13 on motor shaft 15 rotates the worm wheel 17 in a direction to move the crank rods 23 and 25 and the piston 35 in an upward direction in upper housing 31. As the worm wheel 17 rotates, the off center pin 29 moves the piston 35 upward by means of crank rods 21 and 23 with the crank rod tracks 25 and 27 riding on shaft 19. The top of piston 35 compresses the spring 43 as the piston is moved upward by the crank rods 25 and 27, and clamp member 53 moves upward to engage a work piece 54. The spring 43 accommodates work pieces that are slightly oversize. The spring also acts as a sensing device for soft clamping. It senses work pieces out of position or oversize (excessive resistance). It also senses work pieces not being in place through insufficient mechanical resistance. The sensing is accomplished by sensing the length of spring 43 via the position of washer 46 relative to proximity sensor 57. Examples of suitable proximity sensors are shown in U.S. Pat. No. 3,732,443 "On-Off Detection Device"—Rodger T. Lovrenich inventor, and U.S. Pat. No. 4,446,427 "Sensing Device"—Rodger T. Lovrench inventor. The spring length is used to determine energy stored in the spring which is a function of the mechanical resistance at the clamp. This mechanical resistance sensing is reported back to the sequence controller 12 on wire 59. Other arrangements for sensing the energy stored in the spring may be used.

The sequence controller initiates proper action by rotating the motor shaft clockwise, rotating the motor shaft counterclockwise, and stopping the motor shaft. A continuing sequence can be as follows: rotate the worm wheel clockwise one hundred and eighty-three degrees, time out for one and one-half minutes, rotate the worm wheel one hundred and eighty-three degrees counter clockwise, and time out for thirty seconds. If no work piece is in place or a work piece is not within tolerance, the desired action can be taken such as shutting off power for example.

When the clamp member 53 is pushed up to the clamping position, the worm wheel 17 has been rotated so that the pin 29 is approximately three degrees past vertical alignment with pin 33 and shaft 19 as shown in FIG. 1, and the motor is stopped. In this position, with motor power off, the downward thrust of the spring moves the ends of the crank rod tracks 25 and 27 against the shaft 19 assuring a positive clamp action even under power failure conditions.

When the sequence controller 12 issues a release command to the motor 11, the worm wheel 17 is rotated in the opposite direction by the drive gear 13. The pin 29 moves the crank rods 21 and 23 and the connected piston 35 downward, with the tracks 25 and 27 riding on shaft 19. During this downward movement, the compression energy in spring 43 is released as clamp member 53 moves downward.

Figure 4:
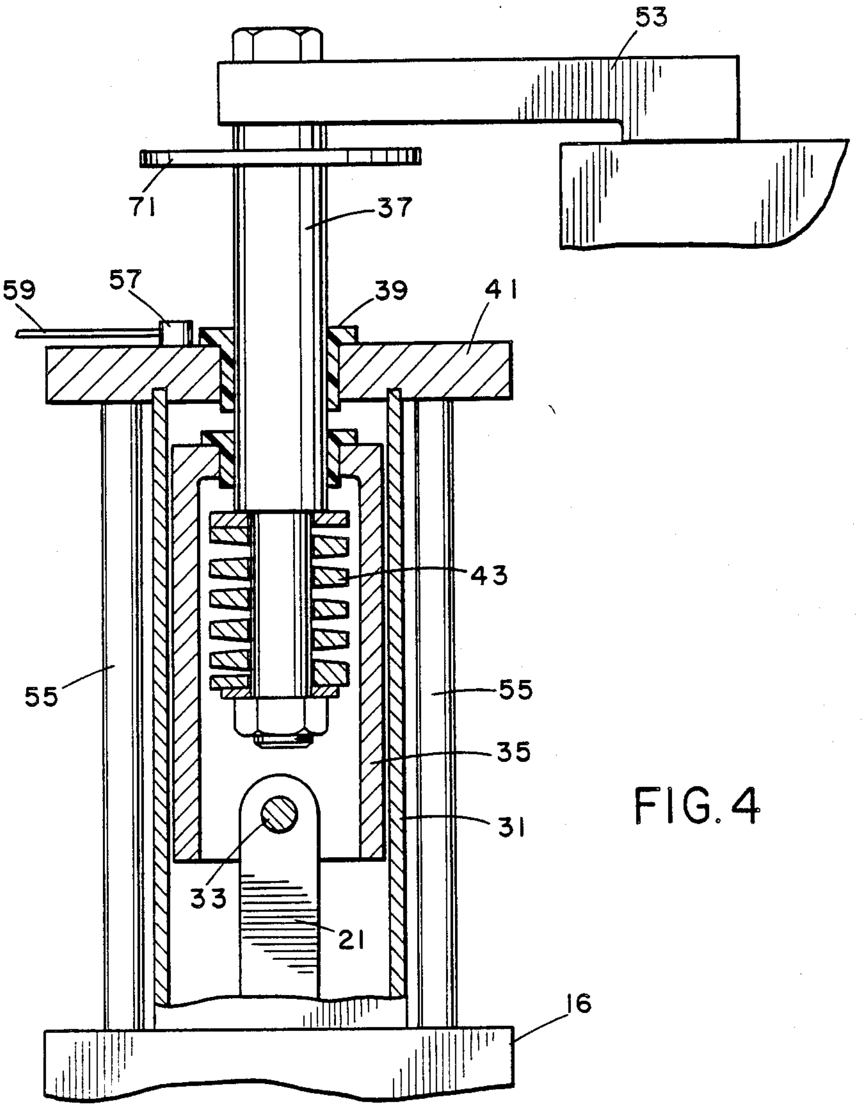
FIG. 4 is a partial view of of an alternate construction of the clamping device shown in FIGS. 1-3, partly sectioned, and discloses a spring arrangement wherein the spring is mounted inside the piston rather than outside, providing a construction which has spring deflection when the clamp pulls on the load.

It will be apparent that the device can be arranged to pull the clamp member 53 into the clamped position rather than pushing it into the position as shown in this embodiment. An alternate construction is shown in FIG. 4 wherein the spring 43 is mounted inside piston 35. In this embodiment the spring 43 will compress when the piston 35 is pulled down.

The sensor 57 in this alternative construction is mounted on the top of top plate 41. A washer 71 of electrically conductive material is rigidly fixed to clamp rod 37. Sensing of spring length is accomplished by measuring the position of washer 71 relative to sensor 57.

Figure 5:
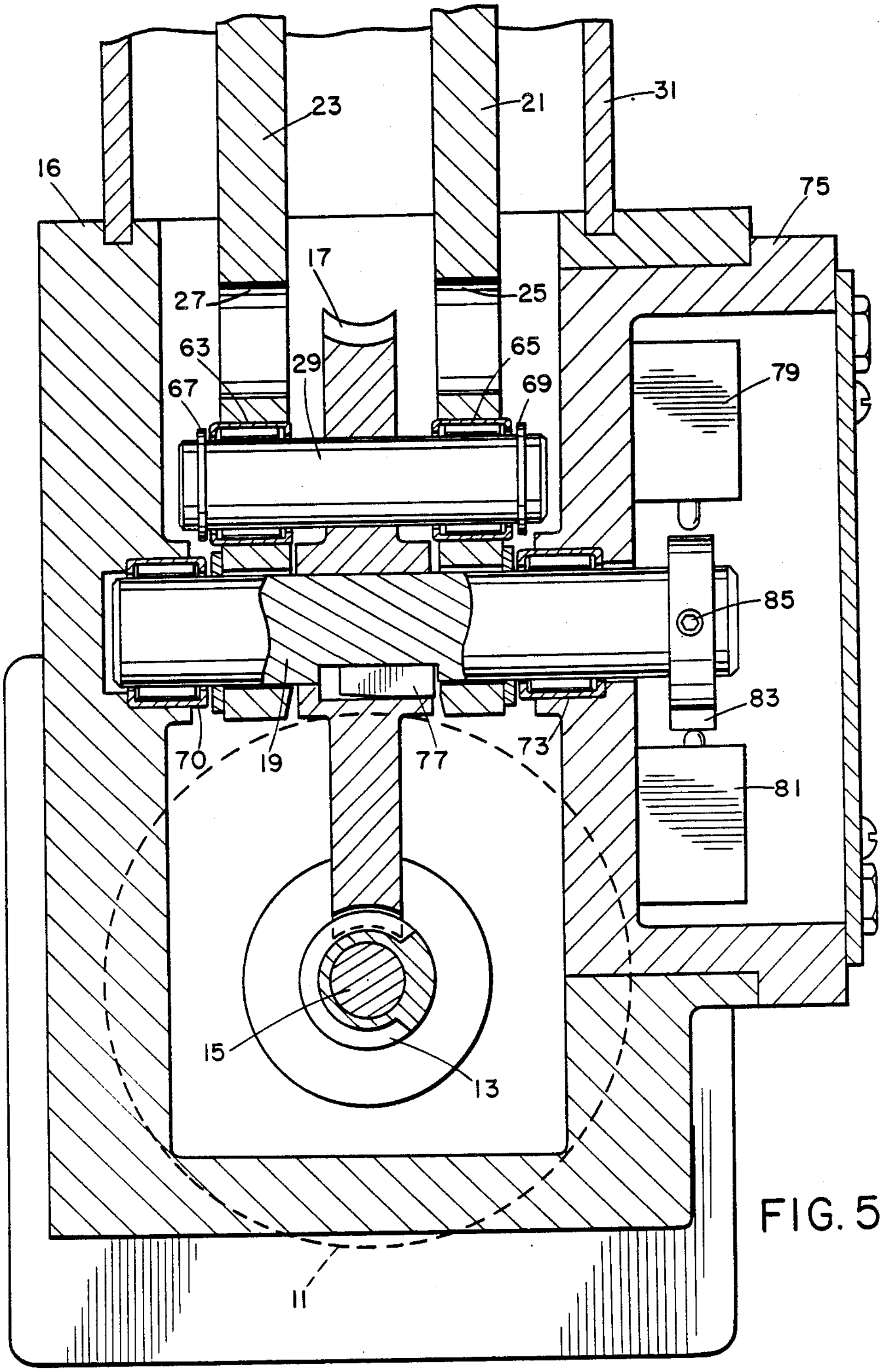
FIG. 5 is a sectional view taken on line 5—5 of FIG. 1 and including an alternative embodiment with limit switches to control clamping action.

A second embodiment of the invention is demonstrated in FIG. 5. The general internal construction is the same as in the first embodiment. Crank rods 21 and 23 are mounted on pin 29 with bearings 63 and 65. The bearings are held in place with snap rings 67 and 69. Shaft 19 extends through bearings 70 and 73 mounted in drive housing 16 and cover plate 75 respectively. Worm wheel 17 is keyed to shaft 19 with key 77.

The second embodiment is used with a conventional electric motor and uses limit switches for control. In this embodiment limit switches 79 and 81 are mounted on cover plate 75. A cam 83 is connected to shaft 19 with screw 85. Limit switch 81 is shown closed by cam 83 when shaft 29 has been rotated in one direction to the clamped position for example. The switch 81 turns off the motor. The cycle is timed out for an operation on the work piece. The shaft 19 is then rotated in the other direction and the limit switch 79 is actuated to stop the motor in the clamp cycle start position. A time out is executed while the work piece is unloaded and a new work piece is loaded in.

The sensor 57 in this embodiment is mounted on top of top plate 41 and connects with the sequence controller as in the first embodiment. A washer of electrically conductive material is fixed to clamp rod 37 and moves with it. The sensor senses position of the washer to report conditions of the clamp 53 such as work piece acceptable, work piece oversize, work piece out of position, and work piece not in place.

The use of two crank arms enables the device to be unusually small for a high amount of thrust. Non sleeve type low friction bearings such as the needle bearings 63, 65, 70 and 73 provide high efficiency even when the unit has been locked up for a long time. After setting in the locked position the motor 11 can easily rotate the worm wheel 17 in the opposite direction from the locking action to unlock the unit.

The device is simple and effective.

Having thus described my invention, I claim:

1. A motorized over center clamp, comprising:
motor means;
drive means coupled with said motor means and including over center spring loaded positioning means;
clamping means connected with said spring loaded positioning means for clamping work pieces;
control means connected with said motor means for controlling said motor means and actuating said positioning means to move the clamp means to an over center clamped position and to an unclamped position, said spring loaded positioning means retaining said clamping means in the over center position without the need of external holding power and constructed to accommodate a work piece that is over size; and
sensing means for sensing the clamping force provided by said clamping means as a function of energy stored in said spring means.

2. A motorized over center clamping device, comprising:

an electric motor;

drive wheel means mounted on a rotary drive wheel shaft and coupled to said electric motor for rotation by said electric motor;

crank arm means rotationally connected to said drive wheel means in an off center position and having curved closed end track means in sliding engagement with said drive wheel shaft for positioning said clamp device in an over center clamped position;

housing means containing slidable piston means, said piston means connected with said crank arm means;

clamp rod means coupled with said piston means and extending out of said cylinder means;

clamping means connected to said clamp rod means;

spring means positioned on said clamp rod means so that movement of said piston means to the clamped position compresses said spring means and said clamping means is retained in the clamped position under spring pressure against a closed end of said curved track means; and control means connected with said electric motor for controlling said electric motor and rotating said drive wheel means to move the piston means and associated clamping means to the clamped and unclamped position;

whereby the clamping means is held in the clamped condition without the need of external holding power.

3. A motorized over center clamp according to claim 2 wherein sensing means is provided in association with said spring means for sensing the energy stored in said spring means to indicate the condition of the clamping means in the clamped position.

4. A motorized over center clamp according to claim 3 wherein the sensing means senses the length of the spring means.

5. A motorized over center clamp according to claim 4 wherein the sensing means includes an element of electrically conductive material movable with said clamp rod means; and an inductive type sensing device fixed in position relative to said clamp rod means, said sensing device being electrically connected with said control means.

6. A motorized over center clamp according to claim 2 wherein the crank arm means includes a pair of identical crank arms, one mounted on each side of said drive wheel means to avoid offset loads on said drive wheel means, each crank arm including a curved closed end track.

7. A motorized over center clamp according to claim 6 wherein said housing means and piston means slidably contained therein are configured to avoid rotation of the piston within said housing.

8. A motorized over center clamp according to claim 5 or 6 wherein said drive wheel means is mounted on said drive shaft with low friction bearings and said crank arm means is mounted on said drive wheel means with low friction bearings.

9. An over-center clamp for engaging and holding a workpiece comprising drive means for imparting an arcuate stroke about a shaft, crank means including means rotatably mounting said crank means to said drive means eccentrically of said shaft for orbital motion about said shaft, and arcuate guide means coaxial with said mounting means and engaging said shaft, clamp means mounted for linear motion orthogonally of said shaft, spring means, and means coupling said crank means to said clamp means through said spring means such that motion of said crank means about said shaft is transmitted to said clamp means through said spring means, said guide means being such that said mounting means is over-center with respect to said shaft in the clamping position of said clamp means whereby said spring means locks said crank means and said mounting means in said clamped position.

10. The clamp set forth in claim 9 wherein said coupling means comprises a piston slidably carried in a housing and means pivotally coupling said crank means to said piston, said spring means being captured between said piston and said clamp means.

11. The clamp set forth in claim 10 wherein said piston and said housing are non-circular axially of said clamp means.

12. The clamp set forth in claim 9 further comprising proximity detector means mounted on said housing and said clamp means for monitoring position of said clamp means with respect to said housing.

13. The clamp set forth in claim 12 wherein said clamp means includes a clamp rod slidably carried by said housing, and wherein said coupling means and said proximity detector means comprises a washer positioned between said spring and said rod.

14. The clamp set forth in claim 9 wherein said crank means comprises a pair of crank arms respectively disposed on opposite sides of said activating means.

15. The clamp set forth in claim 14 wherein said guide means comprises arcuate slots in said crank arms slidably embracing said shaft.

16. The clamp set forth in claim 9 wherein said drive means comprises a wheel mounted for rotation on said shaft and means for selectively rotating said wheel.

17. The clamp set forth in claim 16 wherein said selectively-rotating means comprises an electric motor having an output shaft, and a gear mounted on said shaft and coupled to said wheel.

18. The clamp set forth in claim 17 further comprising limit switch means mounted in fixed position relative to said shaft, and means on said shaft for engaging said limit switch means.

* * * * *